United States Patent
Cuellar et al.

(10) Patent No.: US 11,196,447 B2
(45) Date of Patent: Dec. 7, 2021

(54) COMPUTER-IMPLEMENTED METHOD FOR ERROR-CORRECTION-ENCODING AND ENCRYPTING OF A FILE

(71) Applicant: Siemens Aktiengesellschaft, Munich (DE)

(72) Inventors: Jorge Cuellar, Baierbrunn (DE); Tiago Gasiba, Munich (DE); Martin Wimmer, Neubiberg (DE)

(73) Assignee: SIEMENS AKTIENGESELLSCHAFT

(*) Notice: Subject to any disclaimer, the term of this patent is extended or adjusted under 35 U.S.C. 154(b) by 75 days.

(21) Appl. No.: 16/679,770

(22) Filed: Nov. 11, 2019

(65) Prior Publication Data

US 2020/0162106 A1    May 21, 2020

(30) Foreign Application Priority Data

Nov. 16, 2018  (EP) .................................. 18206677

(51) Int. Cl.
*H03M 13/00* (2006.01)
*H03M 13/11* (2006.01)
(Continued)

(52) U.S. Cl.
CPC ......... *H03M 13/114* (2013.01); *G06F 21/602* (2013.01); *G06F 21/6209* (2013.01);
(Continued)

(58) Field of Classification Search
CPC ............. H03M 13/114; H03M 13/453; H03M 13/6508; G06F 21/602; G06F 21/6029; G06F 2221/2107
See application file for complete search history.

(56) References Cited

U.S. PATENT DOCUMENTS

| 5,870,470 A | 2/1999 | Johnson et al. |
| 6,870,929 B1* | 3/2005 | Greene ................. H04L 9/0637 380/28 |

(Continued)

FOREIGN PATENT DOCUMENTS

| CN | 107615730 A | 1/2018 |
| EP | 1193904 A2 | 4/2002 |

(Continued)

OTHER PUBLICATIONS

European Search Report for Application No. 18206677.9, dated May 8, 2019.

(Continued)

*Primary Examiner* — Christine T. Tu
(74) *Attorney, Agent, or Firm* — Schmeiser, Olsen & Watts LLP

(57) ABSTRACT

A computer-implemented method for error-correction-encoding and encrypting of a file is provided. The file is split into at least two blocks. The first block is encrypted using a given encryption key. The encrypted first block is encoded twice using a first and second forward error correction code of the first block. Each subsequent block is encrypted by performing an algebraic operation. The encrypted block is encoded twice using a first and second forward error correction code for this block, wherein a cryptographic indexing function provides a set of indices used by the second forward error correction code to produce the second encoded chunk. The first encoded chunks of each encrypted block are outputted. The computer-implemented method enables secure transmission of a file content between low power devices.

14 Claims, 4 Drawing Sheets

(51) Int. Cl.
 *G06F 21/60* (2013.01)
 *G06F 21/62* (2013.01)
 *H03M 13/45* (2006.01)

(52) U.S. Cl.
 CPC ..... *H03M 13/453* (2013.01); *H03M 13/6508* (2013.01); *G06F 2221/2107* (2013.01)

(56) References Cited

U.S. PATENT DOCUMENTS

| | | |
|---|---|---|
| 2008/0320358 A1 | 12/2008 | Pandel et al. |
| 2011/0103580 A1 | 5/2011 | Hazay et al. |
| 2011/0119480 A1* | 5/2011 | Massoudi ............ H04N 7/1675 713/150 |
| 2017/0237715 A1 | 8/2017 | Karkkainen |
| 2018/0139041 A1* | 5/2018 | Choi ........................ H04L 9/14 |

FOREIGN PATENT DOCUMENTS

| | | |
|---|---|---|
| JP | H09230787 A | 9/1997 |
| JP | 2008035135 A | 2/2008 |
| JP | 2008508757 A | 3/2008 |
| JP | 2017041679 A | 2/2017 |
| JP | 2018515815 A | 6/2018 |
| KR | 20120127607 B1 | 11/2012 |
| WO | 2017030117 A1 | 2/2017 |
| WO | 2008013160 A1 | 6/2018 |
| WO | 2016186241 A1 | 6/2018 |

OTHER PUBLICATIONS

Japanese Office Action for Application No. 2019-190388, dated Apr. 20, 2021.
Indian Office Action for Application No. 201944045473, dated Sep. 23, 2021.

* cited by examiner

COMPUTER-IMPLEMENTED METHOD FOR ERROR-CORRECTION-ENCODING AND ENCRYPTING OF A FILE

CROSS-REFERENCE TO RELATED APPLICATIONS

This application claims priority to EP Application No. 18206677.9, having a filing date of Nov. 16, 2018, the entire contents of which are hereby incorporated by reference.

FIELD OF TECHNOLOGY

The following relates to a computer-implemented method, an encoding module, a transmitter, a decoding module, a receiver, and a computer program product for forward-error-correction-encoding and encrypting of a file.

BACKGROUND

For interconnected devices exchanging data and communicating with each other via communication networks the data transmission shall be secure and reliable. In general, two methodologies can be used for data transmission: with feedback, e.g. via the Transmission Control Protocol, or without feedback. When feedback is provided, the transmitted data is guaranteed to arrive in order and transmission errors can be eliminated by repeating missing or erroneous received data blocks. However, with feedback, the transmission speed is generally lower. When no feedback is provided, as e.g. in the case of transmission via a data-diode, the transmitted information is not guaranteed to be in sequence and can partially be lost. To protect data against transmission errors, forward error correction codes can be applied. To further guarantee confidentiality, data can be cryptographically encrypted using symmetric or asymmetric cryptographic algorithms. A combined cryptographic encryption and forward error correction is usually performed on an entire data file which is generally computationally intensive and complex.

In case of devices having small power, small computing capabilities, and small memory, e.g. for Internet-of-Things devices and the like, transmission and encryption schemes are required to be efficient and effective.

SUMMARY

An aspect of embodiments of the present invention relates to enable cryptographic protection and secure transmission of a file, particularly for transmission between devices having small memory and/or sparse computing power.

A first aspect of embodiments of the invention relates to a computer-implemented method for error correction encoding and encrypting of a file wherein
a) the file is split into at least two blocks,
b) the first block is encrypted using a given encryption key resulting in an encrypted first block, the encrypted first block is encoded twice using a first and second forward error correction code of the first block resulting in a first and second encoded chunk of the first encrypted block,
c) for each subsequent block, the subsequent block is encrypted by performing an algebraic operation with the second encoded chunk of the previously processed encrypted block resulting in an encrypted subsequent block, each encrypted subsequent block is encoded twice using a first and second forward error correction code for this subsequent block resulting in a first and second encoded chunk for this encrypted subsequent block, wherein a cryptographic indexing function, which is parametrized by the encryption key, provides a set of indices used by the second forward error correction code for this subsequent block to produce the second encoded chunk for this subsequent block, and
d) the first encoded chunks of each encrypted block are outputted.

It is an advantage of embodiments of the invention that cryptographic encryption and forward error correction encoding can be performed simultaneously wherein memory consumption on the encoder and decoder side is reduced. Sensitive information can be protected against transmission errors and for confidentiality. The file, i.e. data, data file or information, is split into at least two blocks and each block can be processed separately. The second and each of the subsequent blocks can be encrypted and forward error correction encoded applying the same methods steps. The simultaneous encryption and encoding can save computing time and/or memory, since the method can avoid intensive use of costly encryption/decryption functions. Only the first block of the file can be encrypted using an expensive encryption, while maintaining the communication private. The method can be useful for Internet-of-Things devices as transmitter and/or receivers which generally are power and/or complexity constrained devices. The memory consumption of the presented method may be lower than for performing forward error correction and encryption on the whole file itself.

If not indicated differently in the following description, the term "encrypting" is related to a cryptographic encryption algorithm, while the term "encoding" is related to a forward error correction algorithm.

The output of the method steps comprises first encoded chunks of each respective block of the original file. The first encoded chunks contain bits of information of the original file in an encrypted and encoded form. The first encoded chunks can for example be transmitted to a receiver. The computer-implemented method can particularity be performed by at least on processor.

If not indicated differently the terms "calculate", "perform", "computer-implemented", "compute", "determine", "generate", "configure", "reconstruct", and the like, may be related to acts and/or processes and/or steps which change and/or generate data, wherein data can particularly be presented as physical data, and which can be performed by a computer or processor. The term "computer" can be interpreted broadly and can be a personal computer, server, pocket-PC-device, mobile computing device, a communication device which can process data, or a processor such as a central processing unit (CPU) or microprocessor.

The first and/or second forward error correction codes for a respective block used with the computer-implemented method can be fountain codes or rate-less erasure codes.

The algebraic operation may be an exclusive-or-function (XOR-function) outputting a respective encrypted block.

The encryption of the first block is performed using a given encryption key. A symmetric or asymmetric encryption algorithm can be applied.

The cryptographic indexing function, which can be described as an index-generating function, is parametrized by the encryption key and provides a set of indices to index symbols of an encoded chunk of the second or one of the subsequent blocks. The order of the indices provides by the cryptographic indexing function may be encrypted and can therefore not easily be deciphered.

According to an embodiment of the computer-implemented method the cryptographic indexing function can be parametrized by the number of the block it is used for.

The cryptographic indexing function can be different for each block providing a stronger encoding. The cryptographic indexing function may beknown on the receiver side for decoding received encoded chunks.

According to an exemplary embodiment of the computer-implemented method the first and second forward error correction code of the first and/or of one of the subsequent blocks can be similar or different.

The first and second forward error correction codes for each block can be based on the same or different codes or algorithms. The applied forward error correction codes may be known on the receiver side for decoding.

According to an exemplary embodiment of the computer-implemented method different cryptographic indexing functions can be used by the forward correction codes for different blocks.

The cryptographic indexing function can be different for each block providing a stronger encoding.

According to an exemplary embodiment of the computer-implemented method symbols of the first encrypted chunk can be shuffled before encoding the first encrypted chunk.

To provide a stronger encryption the symbols of the first block of the initial file can be shuffled using a shuffling algorithm or scheme. The shuffling scheme can be known on the receiver side. An off-the-shelf shuffling algorithm that has these properties can be used.

According to an exemplary embodiment of the computer-implemented method shuffling of the symbols can be parametrized by the encryption key.

The shuffling scheme can also be protected by the encryption key.

According to an exemplary embodiment of the computer-implemented method the cryptographic indexing function can be configured to provide a set of indices with a random order.

According to an exemplary embodiment of the computer-implemented method blocks of the file can be equally or unequally sized.

The sizes of the blocks can be determined based on the preferred level of security.

According to a an exemplary embodiment of the computer-implemented method the first encoded chunks of each encrypted block can be received by a decoding module wherein
a) the first of the first encoded chunks is decoded using a forward error correction decoder and decrypted afterwards using a given decryption key,
b) each subsequent first encoded chunk
   is decoded using a forward error correction decoder,
   is decrypted afterwards by performing an algebraic operation with the second encoded chunk of the previously processed block, which was encoded using a forward error correction code, wherein a cryptographic indexing function, which is parametrized by the decryption key, provides a set of indices used by the forward error correction code to produce the second encoded chunk of the previously processed chunk,
and
c) the decrypted and encoded chunks are outputted.

The first encoded chunks of each respective block can for example be transmitted to a low power device. On the receiver side, the first encoded chunks can be decoded. Therefore, the encoder and the decoder may be related. The decryption of the first encoded chunk of the first block is decrypted using an appropriate decryption key depending on the encryption method. The algebraic operation and/or the forward error correction decoders used for encryption and decoding, respectively, may be related to the operation and codes used for encryption and encoding, respectively. The required information about the used operation and codes can for example be transmitted to a receiver and/or appropriately stored at the receiver side.

Another aspect of embodiments of the invention relates to an encoding module for error correction encoding and encrypting of a file configured to
a) split the file into at least two blocks,
b) encrypt the first block using a given encryption key resulting in an encrypted first block, encode the encrypted first block twice using a first and second forward error correction code of the first block providing a first and second encoded chunk of the first encrypted block,
c) encrypt each subsequent block by performing an algebraic operation with the second encoded chunk of the previously processed encrypted block resulting in an encrypted subsequent block, encode each encrypted subsequent block twice using a first and second forward error correction code for this subsequent block resulting in a first and second encoded chunk for this encrypted subsequent block, wherein a cryptographic indexing function, which is parametrized by the encryption key, provides a set of indices used by the second forward error correction code for this subsequent block to produce the second encoded chunk for this subsequent block,
and
d) output first encoded chunks of each encrypted block.

The encoding module can for example be part of a transmitter or coupled to a transmitting/sending device which is configured to send files or data via a communication link to a receiving device.

Another aspect of embodiments of the invention relates to a transmitter comprising
a) an input module configured to input a file,
b) a splitting module configured to split the file into at least two blocks,
c) an encoding module according to embodiments of the invention
d) and an output module configured to output first encoded chunks.

Another aspect of embodiments of the invention relates to a decoding module for error-correction-decoding and decrypting a file, received by an encoding module according to embodiments of the invention, configured to
decode the first of the first encoded chunks using a forward error correction decoder and decrypt it afterwards using a given decryption key,
decode each subsequent first encoded chunk and decrypt it afterwards by performing an algebraic operation with the second encoded chunk of the previously processed block, which was encoded using a forward error correction code, wherein a cryptographic indexing function, which is parametrized by the decryption key, provides a set of indices used by the forward error correction code to produce the second encoded chunk of the previously processed chunk,
output the decrypted and encoded chunks.

Another aspect of embodiments of the invention relates to a receiver comprising
a) a receiving module configured to receive first encoded chunks from a transmitter according to embodiments of the invention, b) a decoding module according to embodiments of the invention, c) an output module configured to output the decrypted and encoded blocks.

The transmitter and receiver can for example form a system wherein the receiver and the transmitter may be coupled via a wireless or wired communication link and/or network. At least part of the transmitter and/or receiver and/or the system can be implemented as a software and/or hardware.

Further embodiments of the invention relates to a computer program product (non-transitory computer readable storage medium having instructions, which when executed by a processor, perform actions) directly loadable into the internal memory of a digital computer, comprising software code portions for performing the steps of one of a method according to embodiments of the invention when said product is run on a computer. A computer program product can for example be a storage medium, such as a USB-Stick or a downloadable data file.

BRIEF DESCRIPTION

Some of the embodiments will be described in detail, with reference to the following figures, wherein like designations denote like members, wherein.

Equivalent parts in the different figures are labeled with the same reference signs.

DETAILED DESCRIPTION

Figure 1:
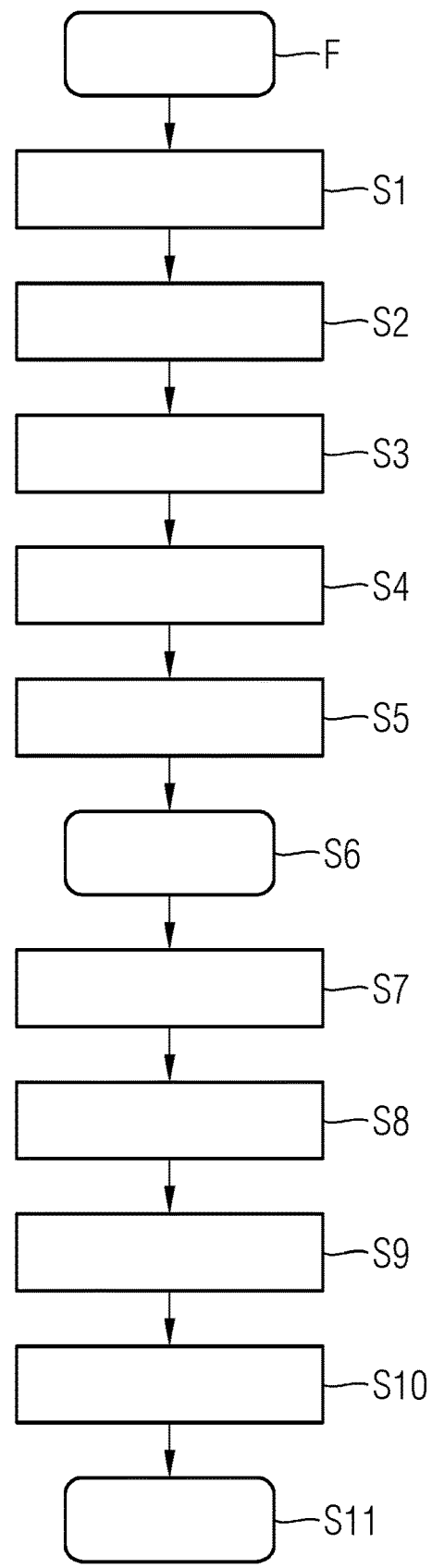
FIG. 1 shows a flow chart of a computer-implemented method according to the invention.

FIG. 1 shows a flow chart of a computer-implemented method according to embodiments of the invention. The method can for example be performed by a transmitter, comprising at least one processor to perform at least part of the method steps, connected to a receiver, comprising at least one processor to perform at least part of the method steps.

It can be the objective of such a setup to transmit a file F in a secure and error-free way. The sender or transmitter comprises an encoding module according to embodiments of the invention. In the first step S1 the given file F, which can be a data file or a data package, is read in and split into at least two blocks comprising of a number of symbols. The blocks can be equally of unequally sized. The number of blocks depends on the file size, the length of a block and/or the level of protection against transmission errors and/or against tampering.

With a larger number of blocks a more secure transmission can be achieved. A block of a file typically comprises symbols which can be lost on the receiver side due to transmission losses or errors. Therefore, a forward error correction code, such as a fountain code, can be used in the following to protect the content against transmission losses or errors.

In the next step S2 of the computer-implemented method the first block is encrypted using a given encryption key with a symmetric or asymmetric encryption algorithm resulting in an encrypted first block.

Optionally, the symbols of the first encrypted block can be shuffled before encoding, providing a stronger protection. The shuffling scheme can be parametrized by the encryption key.

In the next step S3 the encrypted first block is two times forward error correction encoded using a first and second forward error correction code of the first block. The first and second forward error correction code of the first block can be based on the same or different codes. In other words, a forward error correction is performed twice for the encrypted first block.

This step results in a first and second encoded chunk of the first encrypted block. The first and second encoded chunk may comprise extra symbols of the first block according to the used forward error correction code to enable reconstruction of the first block on a receiver side. The first encoded chunk of the first encrypted block is outputted while the second encoded chunk of the first encrypted block is further processed. The first and second encoded chunk of the first encrypted block may comprise information to enable recovering the information content of the first block on the receiver side.

In the next step S4 each subsequent block is encrypted resulting in an encrypted subsequent block. The encryption is based on performing an algebraic operation, such as an exclusive-or-operation, on the subsequent block and the second encoded chunk of the previously performed block. In case of the second block, the encryption is performed using the second encoded chunk of the first block, resulting in an encrypted second block.

In the next step S5 the encrypted block of the respective processed subsequent block, is encoded twice using a first and second forward error correction code for the respective block. The second forward error correction code is performed based on a set of indices provided by a given cryptographic indexing function. The cryptographic indexing function generates indices and can also be parametrized by a respective number of a block. Furthermore, for different block sizes, the indexing function can be adapted to the block size. Different cryptographic indexing functions can be used by the according forward error correction codes for different blocks. The cryptographic indexing function can provide a set of indices in a random order.

The output of this step S5 is a first and second encoded chunk of the respective encrypted block. The first chunk is outputted, while the second chunk is processed if blocks of the original file F remain unprocessed. This step and the previous step are performed for all blocks except the first block of the file.

The first encoded chunks of the respective encrypted blocks are outputted and transmitted to a receiver, step S6. The transmission can for example be via a data diode and/or between low power and low memory devices, such as IoT-devices.

The receiver comprises a decoding module according to some embodiments of the invention. The first encoded chunks are received by the receiver and provided as input for the decoding module in step S7 in order to recover the original source information of the file F.

In the next step S8, the first of the first encoded chunks is decoded using a forward correction decoder and decrypted afterwards using a given decryption key. The first of the first encoded chunks is related to the first block of the original file. For decoding a forward error correction decoder is used which is in accordance with the first forward error correction code used for the first block. The decryption key may be associated with the encryption key depending on the encryption method. The information on the forward error correction codes and respective decoders and/or on the encryption method may be provided, configured and/or known at the receiver side.

In the next step S9 each of the subsequent first chunks of the respective subsequent blocks is decoded using a forward error correction decoder corresponding to the first forward error correction code used for encoding.

Afterwards, in the next step S10, the decoded chunks are decrypted using an algebraic operation, which may be the same as used for the encryption. The algebraic operation is performed on the respective decoded chunk and the second encoded chunk of the previously processed block. Therefore, the decrypted and decoded chunk of the previously processed block is encoded once more using a forward error correction code, wherein a cryptographic indexing function, which is parametrized by the decryption key, provides a set of indices used by the forward error correction code to produce the second encoded chunk of the previously processed chunk. The forward-error correction code and cryptographic indexing function may correspond to the respective encoding scheme. This resulting encoded second chunk of the previously processed block is then used for decrypting the decoded chunk.

The output of the decoding and decryption of all encoded first chunks are decrypted and encoded chunks which can be combined to represent the transmitted version of the original file F, step S11. Due to e.g. additional error-correction symbols of the processed chunks, the file F can be reconstructed without losses.

In both the transmitter and receiver only a single call to an expensive encryption and decryption function, respectively, is performed. Furthermore, this scheme can easily be used to stream information with either fixed or variable block sizes, wherein recipients need to receive the transmission from the beginning to be able to decode the stream. Alternatively, the described scheme can be applied itself to sets of blocks, such that the receiver can join the reception at the transition from a block-set to a new block-set.

Figure 2:
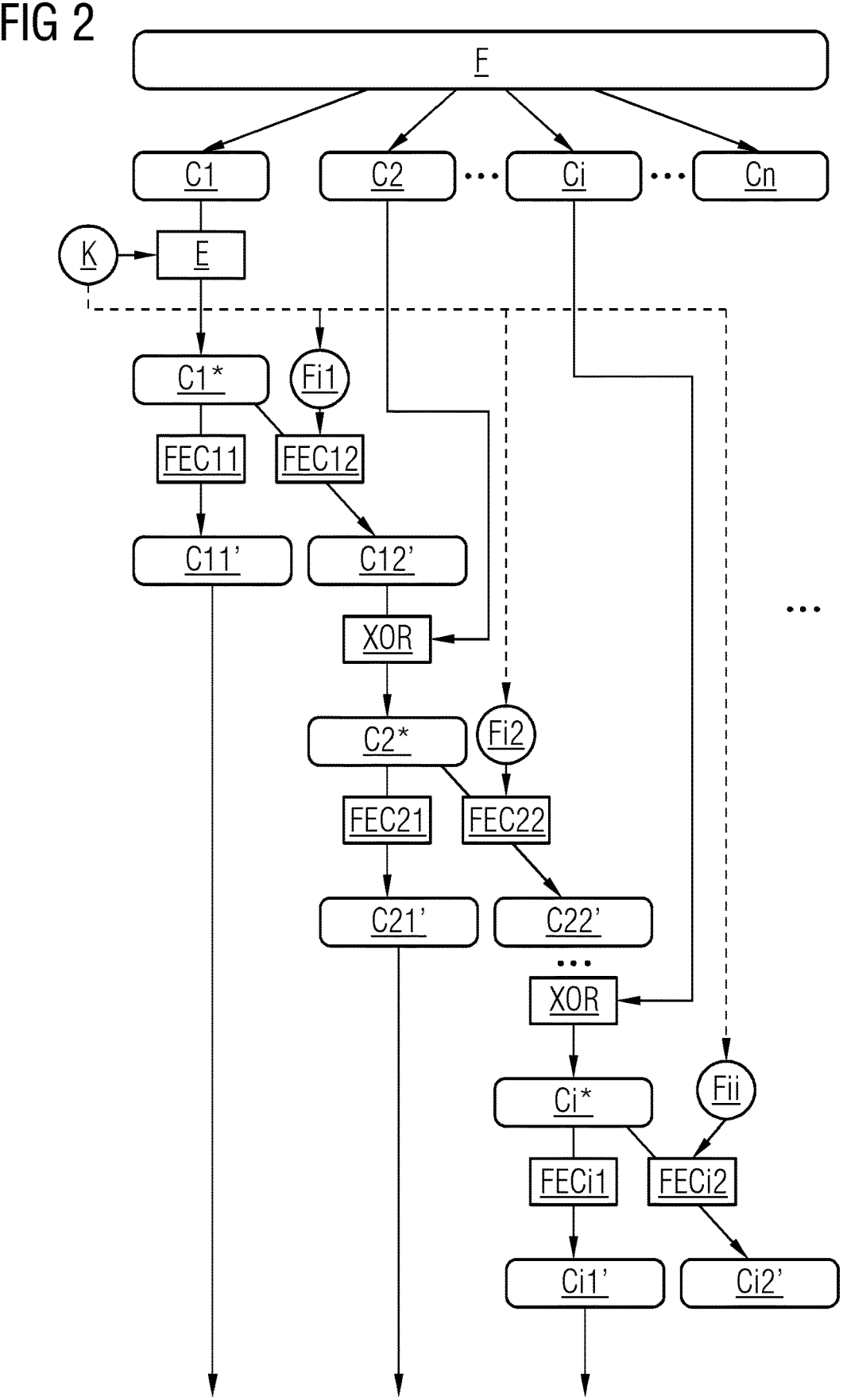
FIG. 2 shows a schematic diagram of a computer-implemented method according to the invention.

FIG. 2 shows a schematic diagram of a computer-implemented method according to embodiments of the invention. The file F is split into several blocks C1, C2, . . . , Ci, . . . Cn. The first block C1 is encrypted using an encryption method E and a given encryption key K resulting in an encrypted first block C1*. Afterwards the encrypted first block C1* is encoded twice using a first and second forward error correction code FEC11, FEC12 resulting in a first and second encoded chunk C11', C12' of the first encrypted block C1*. The first encoded chunk C11' is calculated by using the first forward error correction code FEC1 and a known set of indices. The second encoded chunk C12' is calculated by using the second forward error correction code FEC12 and a respective indexing function Fi1 which can be parametrized by the encryption key K. The first encoded chunk C11' of the first encrypted block C1* is outputted. The second encoded chunk C12' of the first encrypted block C1* is further processed.

In this shown case the first forward error correction codes FEC11, FEC21, FECi1 for each block use given or known indices. Alternatively (not shown), the first forward error correction codes can also use indices provided by an index-generating function. For example, an index-generating function can be provided generating a list of indices which can be transferred to the first and second forward error correction codes of the respective blocks. In this case the first set of indices of the list of indices can be used by the first forward error correction code, the following set of indices by the next and so on.

The second block C2 of the original file F is encrypted by performing an exclusive-or-operation XOR with the second encoded chunk C12' of the first encrypted block C1* resulting in the second encrypted block C2*. The second encrypted block C2* is encoded twice using a first and second error correction code FEC12, FEC22 for the second block C2 resulting in a first and second encoded chunk C21' and C22'. The second forward error correction code particularly uses a set of indices provided by a cryptographic indexing function Fi2. The first encoded chunk C21' of the second encrypted block C2* is outputted. The second encoded chunk C22' of the second encrypted block C2* is further processed.

For each of the subsequent blocks, i.e. the third to the n-th block, Ci, . . . , Cn, the encrypting and encoding of these blocks Ci, . . . , Cn is analogous to the encrypting and encoding of the second block C2. Hence, encryption and encoding of all subsequent blocks is performed iteratively until all blocks of the original file F are processed.

Finally, each first encoded chunk C11', C21', . . . , Ci1', Cn1' of each respective block C1, C2, . . . , Ci, . . . , Cn is outputted.

Figure 3:
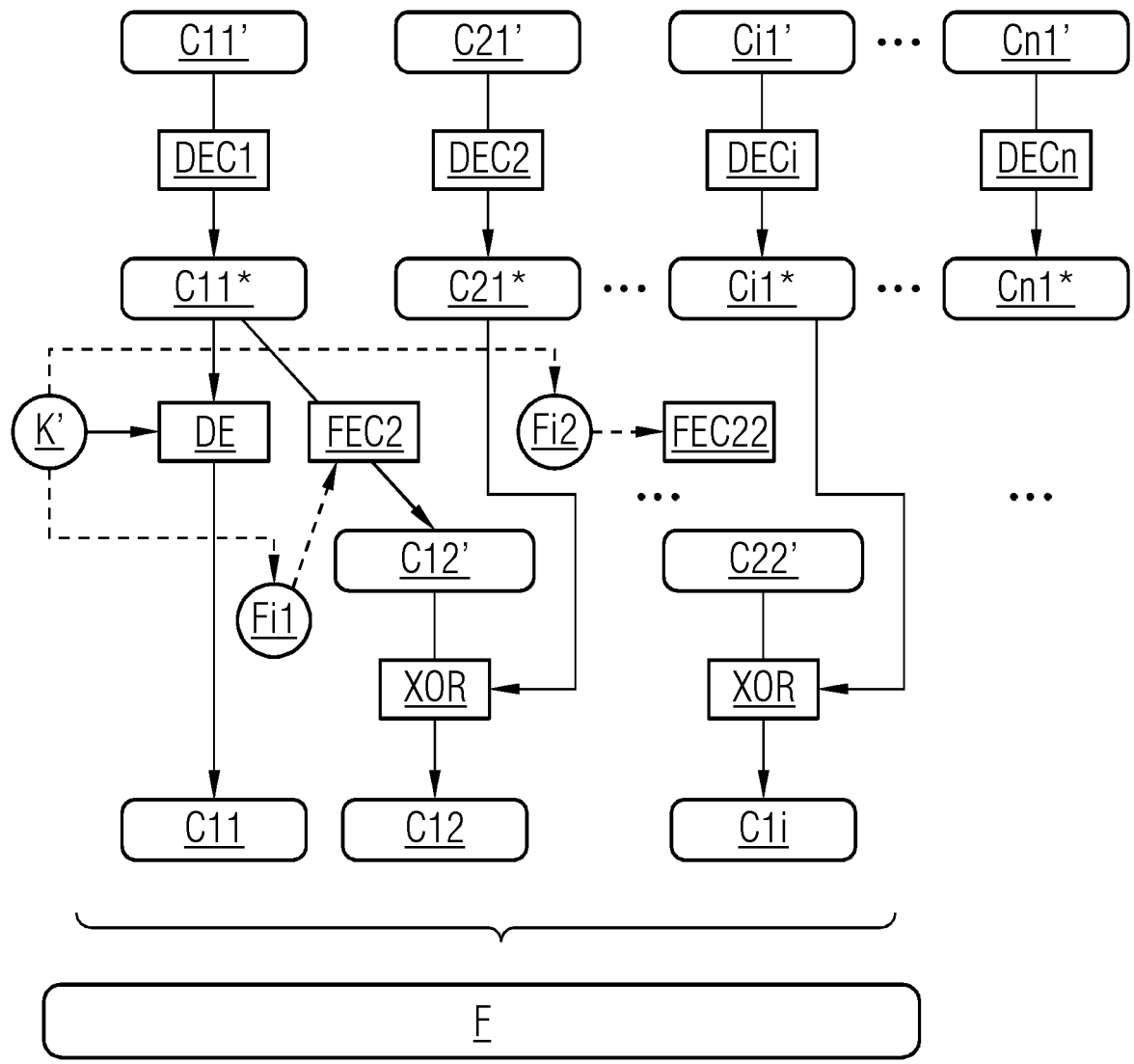
FIG. 3 shows another schematic diagram of a computer-implemented method according to the invention.

FIG. 3 shows the decoding an decrypting on a receiver side. The first encoded chunks C11', C21', Ci1', . . . , Cn1' can be transmitted to a receiver comprising a decoding module.

The first of the first chunks C11' corresponds to the first block C1 of the original file. The first of the first chunks C11' is decoded using a forward error correction decoder DEC1 which corresponds to the first forward error correction code used for encoding of the first block C1. The decoding results in a decoded but still cryptographically encrypted first chunk C11*. The encrypted first chunk C11* is decrypted using an appropriate decrypting algorithm DE and decryption key K' resulting in the decrypted and decoded first chunk C11 which may comprise equivalent information as the first block C1, i.e. all symbols of the first block C1 can be recovered.

The decoding and decryption for all subsequent first encoded chunks C21', . . . , Ci2', . . . , Cn2' is performed as follows. The respective encoded chunks C21*, . . . , Ci2', . . . , Cn2' are decoded using an appropriate forward error correction decoder DEC2, . . . , DECi, . . . , DECn, respectively, which corresponds to the respective first forward error correction code for each respective block used for encoding of the respective block, resulting in decoded first chunks C21*, . . . , Ci1*, . . . , Cn1* which are still cryptographically encrypted. The encryption thereof is performed based on an algebraic operation, corresponding to the one used for encryption, performed using the second encoded chunk of the respective previously processed block, which was encoded using a forward error correction code FEC2, FEC22. The respective forward error correction code FEC2, FEC22 uses a set of indices provided by a cryptographic indexing function parametrized by the decryption key K'. The used forward error correction code FEC2, FEC22 may correspond to the respective codes used for encryption at the transmitter side.

The decoded and decrypted first chunks C12, C1i, . . . are outputted comprising information corresponding to the blocks C2, Ci, . . . of the original file F.

Figure 4:
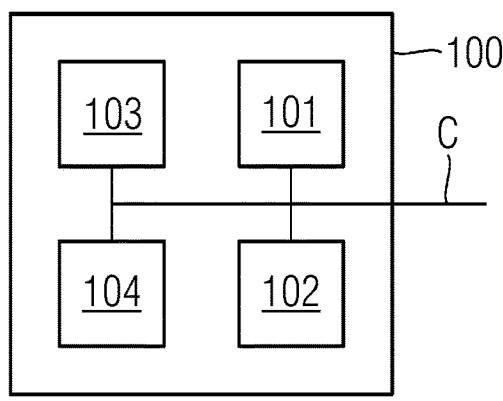
FIG. 4 shows a schematic diagram of a transmitter according to the invention.

FIG. 4 shows a schematic block diagram of a transmitter 100 according to embodiments of the invention. A transmitter 100 can for example be a low power device configured to send encrypted and forward error correction encoded data to a receiver via a communication link C. The transmitter 100 comprises an input module 101, a splitting module 102, an encoding module 103, an output module 104. The transmitter 100 can further comprise at least one processor and/or a memory (not shown). It is configured to perform steps of the computer-implemented method according to embodiments of the invention.

Figure 5:
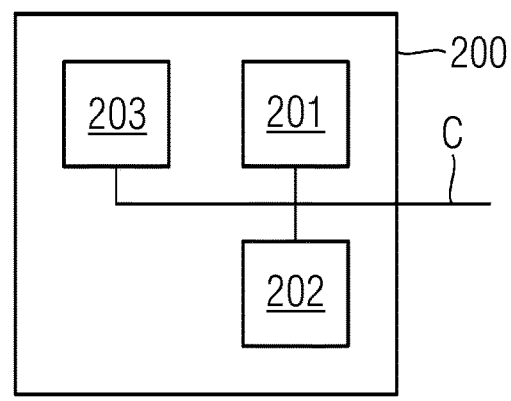
FIG. 5 shows a schematic diagram of a receiver according to the invention.

FIG. 5 shows schematic block diagram of a receiver 200 according to embodiments of the invention. The receiver 200 comprises a receiving module 201, a decoding module 202, and an output module 203. The receiver 200 can further comprise at least one processor and/or a memory. The receiver can be a low power device receiving forward error correction encoded and encrypted data via a communication link C.

Figure 6:
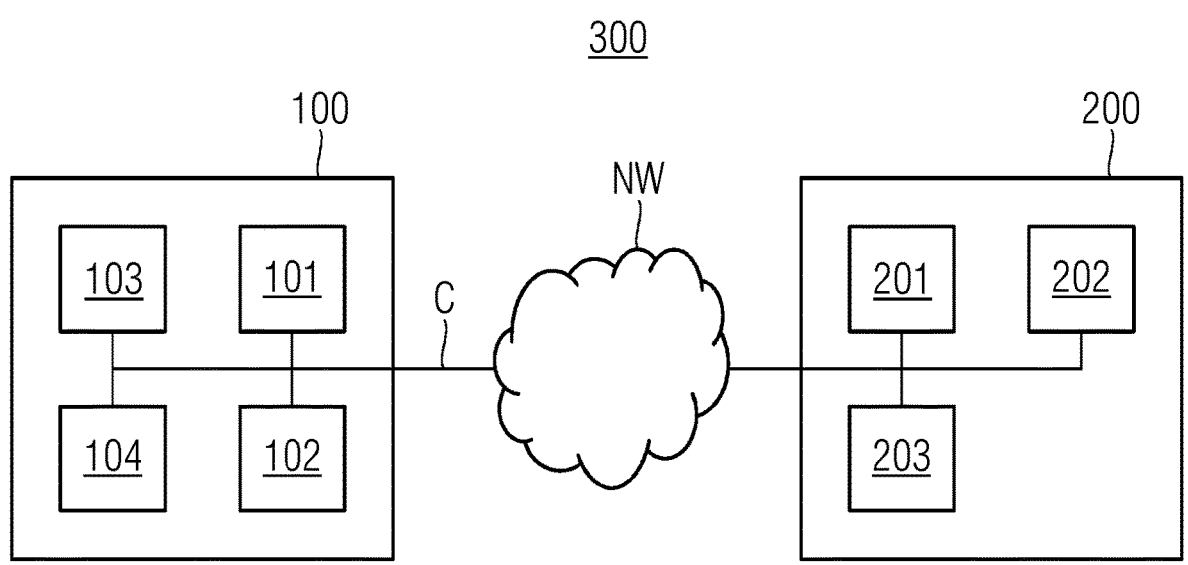
FIG. 6 shows a schematic diagram of a system comprising a transmitter and receiver according to the invention.

FIG. 6 shows a system 300 of a transmitter 100 and a receiver 200 according to embodiments of the invention. The transmitter 100 and the receiver 200 can be coupled to exchange data via a communication network NW. The transmitter 100 and/or the receiver 200 can be an IoT-device. The transmitter 100, comprising modules as shown in FIG. 4, is configured to provide first encoded chunks for each block of a file. The first encoded chunks are encrypted and forward error correction encoded enabling a secure transmission of the file content. The receiver 200, comprising of modules as shown in FIG. 5, is configured to decrypt and decode the received first encoded chunks. After decryption and decoding the original file content can be reconstructed from the decrypted and decoded chunks.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for error correction encoding and encrypting of a file comprising:
   a) splitting the file into at least two blocks,
   b) encrypting a first block using a given encryption key resulting in an encrypted first block, encoding the encrypted first block twice using a first and second forward error correction code of the first block resulting in a first and second encoded chunk of the first encrypted block,
   c) for a subsequent block, encrypting the subsequent block by performing an algebraic operation with the second encoded chunk of the encrypted first block resulting in an encrypted subsequent block, encoding the encrypted subsequent block twice using a first and second forward error correction code for the subsequent block resulting in a first and second encoded chunk for the encrypted subsequent block, wherein a cryptographic indexing function parametrized by the encryption key provides a set of indices used by the second forward error correction code for the subsequent block to produce the second encoded chunk for the subsequent block,
   and
   d) outputting the first encoded chunks of each encrypted block.

2. The computer-implemented method according to claim 1 wherein the cryptographic indexing function is parametrized by the number of the respective block.

3. The computer-implemented method according to claim 1 wherein the first and second forward error correction code of the first and/or of the subsequent block are identical or different.

4. The computer-implemented method according to claim 1 wherein different cryptographic indexing functions are used by the forward correction codes for different blocks.

5. The computer-implemented method according to claim 1, further comprising shuffling symbols of the first encrypted chunk before encoding the first encrypted chunk.

6. The computer-implemented method according to claim 5 wherein shuffling of the symbols is parametrized by the encryption key.

7. The computer-implemented method according to claim 1 wherein the cryptographic indexing function is configured to provide a set of indices with a random order.

8. The computer-implemented method according to claim 1 wherein the at least two blocks of the file are equally or unequally sized.

9. The computer-implemented method according to claim 1, further comprising:
   receiving the first encoded chunks of each encrypted block by a decoding module, wherein
   decoding the first of the first encoded chunks using a forward error correction decoder and decrypting afterwards using a given decryption key,
   wherein the subsequent first encoded chunk
      is decoded using a forward error correction decoder, and
      is decrypted afterwards by performing an algebraic operation with the second encoded chunk of the first block, which was encoded using a forward error correction code, wherein a cryptographic indexing function parametrized by the decryption key provides a set of indices used by the forward error correction code to produce the second encoded chunk of the previously processed chunk, and
   outputting the decrypted and encoded chunks.

10. A computer program product, comprising a computer readable hardware storage device having computer readable program code stored therein, said program code executable by a processor of a computer system to implement a method, directly loadable into the internal memory of a digital computer, comprising software code portions for performing the steps of claim 1 when said product is run on a computer.

11. An encoding module for error correction encoding and encrypting of a file configured to:
   a) split the file into at least two blocks,
   b) encrypt a first block using a given encryption key resulting in an encrypted first block, and encode the encrypted first block twice using a first and second forward error correction code of the first block providing a first and second encoded chunk of the first encrypted block,
   c) encrypt each subsequent block by performing an algebraic operation with the second encoded chunk of a previously processed encrypted block resulting in an encrypted subsequent block, and encode each encrypted subsequent block twice using a first and second forward error correction code for this subsequent block resulting in a first and second encoded chunk for this encrypted subsequent block, wherein a cryptographic indexing function parametrized by the encryption key provides a set of indices used by the second forward error correction code for this subsequent block to produce the second encoded chunk for this subsequent block, and d) output first encoded chunks of each encrypted block.

12. A decoding module for error-correction-decoding and decrypting a file, received from the encoding module according to claim 11, configured to:

decode the first of the first encoded chunks using a forward error correction decoder and decrypt the first of the first encoded chunks afterwards using a given decryption key, decode each subsequent first encoded chunk and decrypt the subsequent first encoded chunk afterwards by performing an algebraic operation with the second encoded chunk of the previously processed block, which was encoded using a forward error correction code, wherein a cryptographic indexing function parametrized by the decryption key provides a set of indices used by the forward error correction code to produce the second encoded chunk of the previously processed chunk, and output the decrypted and encoded chunks.

13. A transmitter comprising:

a) an input module configured to input a file, b) a splitting module configured to split the file into at least two blocks, c) an encoding module configured to encrypt the first block using a given encryption key resulting in an encrypted first block and encode the encrypted first block twice using a first and second forward error correction code of the first block providing a first and second encoded chunk of the first encrypted block, and encrypt each subsequent block by performing an algebraic operation with the second encoded chunk of a previously processed encrypted block resulting in an encrypted subsequent block and encode each encrypted subsequent block twice using a first and second forward error correction code for this subsequent block resulting in a first and second encoded chunk for this encrypted subsequent block, wherein a cryptographic indexing function parameterized by the encryption key provides a set of indices used by the second forward error correction code for this subsequent block to produce the second encoded chunk for this subsequent block, and d) an output module configured to output first encoded chunks.

14. A receiver comprising:

a) a receiving module configured to receive first encoded chunks from the transmitter according to claim 13, b) a decoding module configured for error-correction-decoding and decrypting, and c) an output module configured to output the decrypted and encoded blocks.

* * * * *